United States Patent [19]

Noguchi

[11] Patent Number: 4,948,391
[45] Date of Patent: Aug. 14, 1990

[54] PRESSURE SWING ADSORPTION PROCESS FOR GAS SEPARATION

[75] Inventor: Yutaka Noguchi, Osaka, Japan

[73] Assignee: Vacuum Optics Corporation of Japan, Tokyo, Japan

[21] Appl. No.: 351,201

[22] Filed: May 12, 1989

[30] Foreign Application Priority Data

| May 12, 1988 | [JP] | Japan | 63-115200 |
| Aug. 12, 1988 | [JP] | Japan | 63-201357 |
| Sep. 30, 1988 | [JP] | Japan | 63-246828 |
| Oct. 24, 1988 | [JP] | Japan | 63-268905 |
| Nov. 11, 1988 | [JP] | Japan | 63-285088 |

[51] Int. Cl.$^5$ .............................................. B01D 53/04
[52] U.S. Cl. ...................................... 55/26; 55/58; 55/62; 55/68; 55/74; 55/75
[58] Field of Search ............ 55/25, 26, 31, 33, 58, 55/62, 68, 74, 75, 161–163, 179, 387, 389

[56] References Cited

U.S. PATENT DOCUMENTS

| 3,121,625 | 2/1964 | Broughton | 55/58 |
| 3,796,022 | 3/1974 | Simonet et al. | 55/25 |
| 4,011,065 | 3/1977 | Münzner et al. | 55/25 |
| 4,013,429 | 3/1977 | Sircar et al. | 55/58 X |
| 4,169,715 | 10/1979 | Eriksson | 55/389 X |
| 4,354,859 | 10/1982 | Keller, II et al. | 55/25 |
| 4,406,675 | 9/1983 | Dangieri et al. | 55/58 X |
| 4,440,548 | 4/1984 | Hill | 55/26 |
| 4,561,865 | 12/1985 | McCombs et al. | 55/25 |
| 4,572,723 | 2/1986 | Ward | 55/25 |
| 4,738,692 | 4/1988 | Fresch et al. | 55/26 |

FOREIGN PATENT DOCUMENTS 55-104623  8/1980  Japan ...................................... 55/26

Primary Examiner—Robert Spitzer
Attorney, Agent, or Firm—McAulay Fisher Nissen & Goldberg

[57] ABSTRACT

An improvement of a known pressure swing adsorption process for separating a desired gas from a gas mixture using a cylinder containing an adsorption column is disclosed. The improvement resides in a procedure for regenerating the adsorption column for repeated use, which comprises returning a portion of the desired gas having been separated in the cylinder back into the cylinder at an intermittently varying rate to flow through the column, to efficiently desorb a gas component having been adsorbed by the adsorption column and purge away the desorbed gas from the cylinder.

8 Claims, 9 Drawing Sheets

PRESSURE SWING ADSORPTION PROCESS FOR GAS SEPARATION

BACKGROUND OF THE INVENTION

1. Field of the Invention

The present invention relates to an improvement of a pressure swing adsorption process which is a known process for separating a desired gas from a gas mixture such as air.

2. Description of Prior Art

A separation technique of gas mixtures in which separation of air is representative has been developed. As representative separation processes, there have been heretofore known a distillation process (e.g., low temperature separation process), an adsorption separation process and a membrane separation process. Among these processes, the adsorption separation process (especially, pressure swing adsorption process, generally abbreviated to PSA process) has the advantage that a desired product gas can be separated from a stock gas (feed gas) within a short time from the begining of the operation of the process and can be obtained with a high purity at a relatively high yield, as compared with the low temperature separation process and other processes, and has been employed for recovery of various gases from gas mixtures. The pressure swing adsorption process is shown, for example, in U.S. Pat. Nos. 3,430,418 and 3,564,816.

Recently, a compact system for producing nitrogen gas has been in great demand, for instance, for processing of electronic devices (e.g., LSI), production of various new ceramic materials and storage of substances related to biotechnology. A system for producing oxygen gas which is practically compact, lightweight and easy to handle has been also required for industrial and domestic uses.

It is known that the PSA process is advantageous in that desired gases can be easily obtained using a relatively compact and lightweight apparatus.

A typical PSA process generally comprises the following steps:

Step (1): introducing a gas mixture of two or more gases (such as air) under pressure into a cylinder having therein an adsorption column of an adsorbent which selectively adsorbs thereon gas component(s) other than a desired gas component from an inlet of the cylinder, to allow the adsorbent near the inlet to selectively adsorb the gas component other than the desired gas component and to form a zone of adsorbed gas in the column;

Step (2): keeping the introduction of the gas mixture into the cylinder under such conditions that the gas mixture flows through the column to move the front of the adsorbed gas zone forwards;

Step (3): collecting the desired gas component having passed through the column from an outlet of the cylinder;

Step (4): terminating the introduction of the gas mixture into the cylinder;

Step (5): terminating the collection of the desired gas component;

Step (6): discharging a portion of the pressurized gas mixture remaining in the cylinder; and Step (7): returning a portion of the collected gas component back into the cylinder to flow through the column in the direction opposite to the direction of the movement of the gas mixture in the above step (2), to desorb the gas component having been adsorbed on the adsorbent of the adsorption column and purge away the desorbed gas component from the cylinder.

Steps (1) through (5) are performed for separation of the desired gas, and Steps (6) and (7) are preformed for regeneration of the column.

A representative procedure of the known PSA process is described in more detail by referring to FIG. 1 in the attached drawings.

FIG. 1 illustrates a known two cylinder system used for performing a pressure swing adsorption process. Each of two cylinders 11, 11a contains therein an adsorption column of an adsorbent. The cylinders 11, 11a have, respectively, inlets 12, 12a for a gas mixture to be separated and outlets 13, 13a for collecting a desired gas having been separated from the gas mixture in the respective cylinder. The inlets 12, 12a are connected to a source of gas mixture 14 by pipe lines via valves 15, 15a, respectively. The inlets 12, 12a are additionally connected to each other through a pipe line via valves 16, 16a. Between the valves 16, 16a, the pipe line has a waste gas line 17. The outlets 13, 13a are connected to a product gas reservior 18 by pipe lines via valves 19, 19a, respectively. The outlets 13, 13a are additionally connected to each other through a pipe line via valves 20, 20a. Between the valves 20, 20a, the pipe line has a branch pipe line which is connected to the product gas reservoir 18 via a pressure controlling valve 21.

The pressure swing adsorption process is performed in the system of FIG. 1 in the following manner.

A gas mixture (e.g., air and industrially produced gas mixture) is continuously supplied under pressure from the source of gas mixture 14 into the cylinder 11 from the inlet 12. The supply of the gas mixture is performed by opening the valve 15. During this procedure, the valves 15a, 16, 19, 20 are all closed. The gas mixture continuously introduced into the cylinder 11 advances forwards during which one or more gas components other than a desired gas component is adsorbed by the adsorbent of the adsorption column to form an adsorbed gas zone. Along with the advancement of the gas mixture, the front of the adsorbed gas zone moves forwards in the cylinder 11. When the pressure of the gas mixture in the cylinder 11 reaches a predetermined maximum level (at that time the front of the adsorbed gas zone resides midway between the both ends of the adsorption column), the valve 19 is opened to discharge the desired gas from the outlet 13 to direct it to the product gas reservoir 18. Then, just before the front of the adsorbed gas zone reaches the end of the column, the valve 15 is closed to terminate the supply of the gas mixture into the cylinder, and simultaneously, the valve 19 is closed. By a series of these procedures, a gas separation process is complete.

Subsequently, the adsorption column regeneration process is started. In this process, the valve 12 is first opened to discharge the pressurized gas remaining in the cylinder 11 through the waste gas line 17. The waste gas line 17 may be connected to a vacuum system (not shown) to more efficiently discharge the pressurized gas in the cylinder 11. By this discharging process, most of the gaseous portion remaining in the cylinder 11 is removed. However, most of the gas component adsorbed by teh adsorbent of the adsorption column remains in the cylinder because desorption of the adsorbed gas component hardly takes place by the above procedures simply relying on the difference of pressure between the interior of the cylinder 11 and the waste gas line. The desorption of the adsorbed gas component is then performed using a portion of the product gas (the desired gas component) previously collected in the product gas reservoir 18. For performing the desorption of the adsorbed gas component, a portion of the product gas is continuously returned into the cylinder 11 by opening the valve 20, placing the pressure control valve 21 under an operative condition. Thus returned product gas advances in the cylinder 11, desorbing the adsorbed gas component, and is discharged from the waste gas line 17. The gas may be discharged more efficiently by means of a vacuum system which may be provided to the waste gas line 17. The supply of the product gas is continued until most of the adsorbed gas component is desorbed and discharged from the waste gas line 17. The above procedure for desorbing the adsorbed gas component using a portion of the product gas is named a purging procedure. By a series of these procedures, the column regeneration process is complete.

In the pressure swing adsorption process, the set of the gas separation process and the column regeneration process is repeated to produce a required amount of the desired gas. In the first step in the next cycle, that is, the step for introduction of a gas mixture into the cylinder, a portion of the product gas may be returned to the cylinder for so controlling the pressure in the cylinder as to avoid abrupt change of the pressure.

When the gas separation process is performed in the cylinder 11, the column regeneration process is performed in the cylinder 11a. When the column regeneration process is performed in the cylinder 11, the gas separation process is performed in the cylinder 11a. Thus, the product gas (i.e., desired gas component) can be continuously collected in the reservoir 18.

In the pressure swing adsorption process, the pressure in the cylinder varies within a wide range to the extent from several Torr to several ten kg/cm$^2$G. Each step of the pressure swing adsorption process is carried out from several seconds to several minutes. A set of valves provided to the system are opened and closed automatically according to a predetermined program. One cycle of the pressure swing adsorption process, namely, one set of the gas separation process and the column regeneration process is performed from several ten seconds and several ten minutes. Therefore, the pressure change in the cylinder is apt to occur abruptly within a very short time. The abrupt change (or variation) of the pressure in the cylinder is apt to cause certain troubles. For instance, a neatly arranged adsorbent of the adsorption column may be disarranged, and the gas flows unsteadily in the cylinder. For example, a portion of the gas flows along the inner wall of the cylinder with insufficient contact with the adsorbent. Otherwise, a portion of the gas flows through a space formed by the disarrangement of the adsorbent with insufficient contact with the adsorbent. Such insufficient contact of the flowing gas with the adsorbent causes poor adsorption or poor desorption. Thus, efficiency of the gas separation process is adversely affected.

In order to obviate the troubles arising from the abrupt variation of the pressure in the cylinder, some measures have been proposed. For instance, it has been proposed to provide a manually operable valve to each of the automatically operable valve to more finely control the period of the gas flow. However, this measure has drawbacks in that the provision of the additional valves makes the gas separation system (apparatus) more complicated and further, fine control of the manual valves is required in the course of performing the gas separation process. It has been also proposed to employ an orifice having a fixed opening size in place of the manual valve. However, the provision of the orifice also makes the gas separation system more complicated and, further, no sufficiently effective improvement observed. Furthermore, it has been proposed to provide flow control valves to the separation apparatus. The provision of a number of flow control valves to the gas separation apparatus is very expensive and not advantageous in industry. Further, the maintenance of flow control valves to keep it under well controlled condition is not easy. Further, there is known the provision of ceramic balls in the cylinder at a space between its inlet and the adsorption column to protect the column from the abrupt pressure change of the introduced gas mixture. The provision of such barrier is not advantageous because resistance to flow of the gas mixture increases.

SUMMARY OF THE INVENTION

It is an object of the present invention to provide an improvement of the known pressure swing adsorption process for gas separation.

It is a specific object of the invention to provide a process for separating gas mixtures which is reduced in the abrupt variation of the gas pressure involved.

It is another object of the invention to provide a process for producing a desired gas from a gas mixture at an increased productivity per adsorbent.

It is a further object of the invention to provide a process for producing a desired gas from a gas mixture efficiently at an increased purity.

There is provided by the present invention a process for selectively separating a desired gas component from a gas mixture of two or more gas components, comprising the steps of:

(1) introducing the gas mixture under pressure into a cylinder having therein an adsorption column of an adsorbent which selectively adsorbs thereon at least one gas component other than the desired gas component from an inlet of the cylinder, to allow the adsorbent near the inlet to selectively adsorb the gas component other than the desired gas component and to form a zone of adsorbed gas in the column;

(2) keeping the introduction of the gas mixture into the cylinder under such condition that the gas mixture flows through the column to move the front of the adsorbed gas zone forwards;

(3) collecting the desired gas component having passed through the column from an outlet of the cylinder;

(4) terminating the introduction of the gas mixture into the cylinder;

(5) terminating the collection of the desired gas component;

(6) discharging a portion of the pressurized gas mixture remaining in the cylinder; and (7) returning a portion of the collected gas component back into the cylinder at an intermittently varying rate to flow through the column in the direction opposite to the direction of the movement of the gas mixture in the step (2), to desorb the gas component having been adsorbed on the adsorbent of the adsorption column and purge away the desorbed gas component from the cylinder.

DETAILED DESCRIPTION OF THE INVENTION

Figure 1:
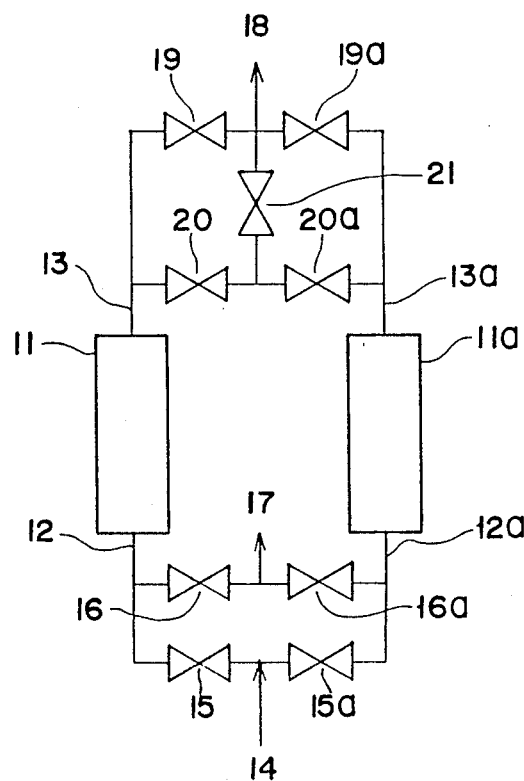
FIG. 1 is a schematic flowsheet showing a system for conducting the conventional pressure swing adsorption process as well as the gas separation system of the present invention.

The improved pressure swing adsorption process of the present invention can be performed using the conventional system of FIG. 1 in the following manner.

In the first step, a gas mixture (e.g., air or an industrially produced gas mixture such as a methanol decomposition gas comprising hydrogen, carbon dioxide, carbon monoxide and water) is continuously supplied under pressure, in the conventional manner, from the source of gas mixture 14 into the cylinder 11 from the inlet 12. From air, nitrogen or oxygen can be selectively collected using an appropriate adsorbent. A number of such appropriate adsorbents are known for trapping oxygen, nitrogen, or other gas. For collection of nitrogen from air, a molecular-sieve carbon can be employed as an adsorbent for trapping oxygen. For collection of oxygen from air, a certain molecular sieve such as MS-5A can be employed as an adsorbent for trapping nitrogen.

The supply of the gas mixture is performed by opening the valve 15. During this procedure, the valves 15a, 16, 19, 20 are closed.

In the above step, the gas mixture is preferably supplied to the cylinder at an intermittently varying rate (i.e., velocity) by changing the position of the valve 15 between the opening position and the closing position at a short interval, that is, in the form of a pulse action. Within the supply period, a set of the valve opening action and the valve closing action is preferably repeated 2 to 5 times. The period of opening the valve preferably ranges from 0.01 to 5 seconds, more preferably 0.05 to 3 seconds, per one opening procedure. The period of closing the valve preferably ranges from 0.1 to 2 seconds, more preferably 0.5 to 1.5 seconds, per one closing procedure. The period for opening and closing for each valve can be set at a fixed value or to vary at each time periodically or non-periodically. It is preferred to perform the pulse action more quickly (namely, at a shorter interval) in the initial stage of this step, because the pressure variation generally takes place very drastically at the intial stage. By the pulse action for supplying the gas mixture into the cylinder, the gas mixture very smoothly advances forwards in the cylinder 11 with steady pulse contact with the adsorbent.

In the course of the continuous or intermittent supply of the gas mixture into the cylinder 11, one or more gas components other than a desired gas component is adsorbed by the adsorbent of the adsorption column to form an adsorbed gas zone. Along with the advancement of the gas mixture, the front of the adsorbed gas zone moves forwards in the cylinder 11.

In the next step, the valve 19 is opened to collect the desired gas component from the outlet 13 to direct it to the product gas reservoir 18. The desired gas component in the cylinder 11 is easily taken out, because the desired gas component is kept in the cylinder at an elevated pressure. In order to not apply abrupt change of the pressure to the adsorption column, it is preferred to take out the desired gas component from the cylinder at an intermittently varying rate. Such intermittent varying rate of the desired gas collection can be accomplished by automatically operating the valve 19 in the same manner as described for the valve 15 used for the gas mixture supply into the cylinder 11.

When the pressure of the gas mixture in the cylinder 11 reaches a predetermined maximum level (generally set at a pressure of lower than 6 kg/cm$^2$), the valve 15 is closed to terminate the supply of the gas mixture into the cylinder 11. The time for termination of the gas mixture supply is previously determined under the condition that the front of the adsorbed gas zone still does not reach the end of the adsorption column at the time of the termination of gas mixture supply. Simultaneously with the termination of the gas supply, the valve 19 is closed to terminate collection of the desired gas from the cylinder 11.

By a series of these steps, the gas separation process is complete.

Subsequently, the adsorption column regeneration process is started.

In the regeneration process, the valve 16 is first opened to discharge the pressurized gas remaining in the cylinder 11 through the waste gas line 17. As is apparent from the above procedure, the gas remaining in the cylinder 11 is still kept under high pressure. Therefore, if the valve 16 is simply opened in the conventional manner to allow the remaining gas flowing out at once, unfavorable irregular flow of the gas likely occurs. Accordingly, it is preferred still in this step to discharge the remaining gas at an intermittently varying rate by automatically operating the valve 16 in the same manner as described for the valve 15 used for the gas mixture supply into the cylinder 11.

The waste gas line 17 may be connected, as described above to a vaccum system to more efficiently discharge the pressurized gas in the cylinder 11. The vacuum system is generally operated after spontaneous discharge of the remaining gas terminates.

By the above-mentioned discharging process, most of the gaseous portion remaining in the cylinder 11 as well as a portion of the gas having been adsorbed by the adsorbent of the adsorption column is removed. However, most of the gas component adsorbed by the adsorbent of the adsorption column remains in the cylinder, because most of the adsorbed gas component is hardly desorbed by the above procedures simply relying on the difference of pressure between the interior of the cylinder and the waste gas line.

Accordingly, the adsorbed gas component is then desorbed using a portion of the product gas (the desired gas component) previously collected in the product gas reservoir 18. According to the present invention, for performing the desorption of the adsorbed gas component, a portion of the product gas should be supplied into the cylinder 11 at an intermittently varying rate, for example, by opening and closing the valve 20, at a short interval, that is, by an opening-closing action in a pulse mode, while opening the pressure control valve 21. The period required for the supply to the product gas into the cylinder generally is set to be not longer than one minute. Within the supply period, a set of the valve opening action and the valve closing action is preferably repeated 2 to 5 times. The period of opening the valve preferably ranges from 0.01 to 5 seconds, more preferably 0.05 to 3 seconds, per one opening procedure. The period of closing the valve preferably ranges from 0.1 to 2 seconds, more preferably 0.5 to 1.5 seconds, per one closing procedure. The period of the valve opening and the valve closing can be set for each valve at a fixed value or to vary at each time periodically or non-periodically. It is preferred to perform the pulse action more quickly (namely, at a shorter interval) in the initial stage of this step, because the pressure variation generally takes place very drastically at the initial stage. By the pulse action for returning the product gas into the cylinder, the product gas smoothly advances forwards in the cylinder 11 with desired steady contact with the adsorbent to efficiently desorb the adsorbed gas to recover it in the gaseous form.

Thus supplied product gas advances very smoothly in the cylinder 11 due to the above-mentioned pulse action of the valves, efficiently desorbing the adsorbed gas component, and is discharged from the waste gas line 17. The gas may be discharged by means of a vacuum system which may be provided to the waste gas line 17. The returning of the product gas is continued until most of the adsorbed gas component is desorbed and purged away from the waste gas line 17. By a series of these procedures, the column regeneration process is complete.

As mentioned hereinbefore, in the pressure swing adsorption process, the set of the gas separation process and the column regeneration process is repeated to produce a required amount of the desired gas.

In the same way as in the conventional pressure swing adsorption process, when the gas separation process is performed in the cylinder 11, the column regeneration process is performed in another cylinder 11a. When the column regeneration process is performed in the cylinder 11, the gas separation process is performed in the cylinder 11a. Thus, the product gas (desired gas component) is continuously collected in the reservoir 18.

The process of the present invention will be further described in detail by referring to other embodiments.

Figure 2:
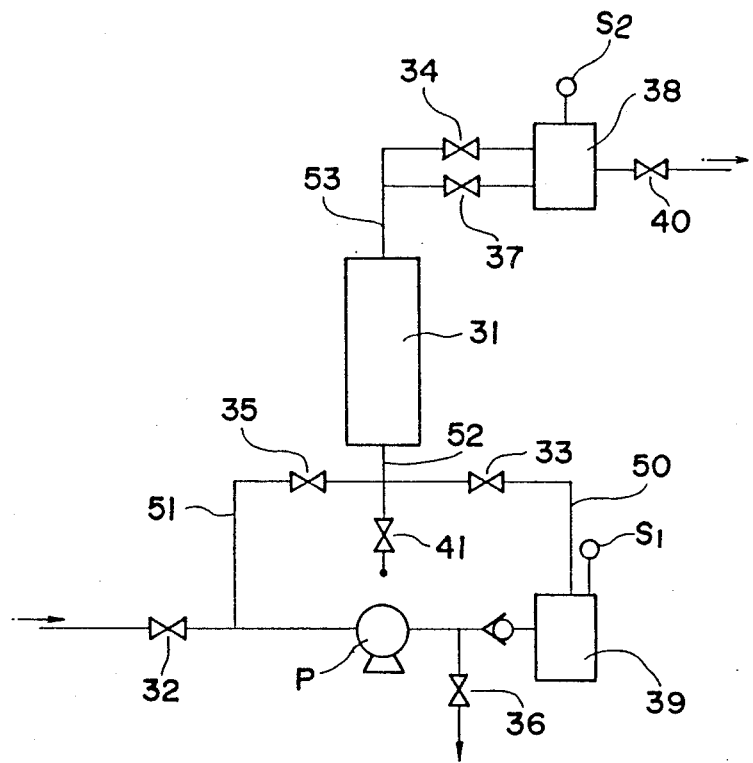
FIG. 2 is a schematic flowsheet showing a system suitably employable for the process of the invention.

FIG. 2 is a schematic flowchart showing a simple system using a single column for separating nitrogen gas from air. In FIG. 2, the system comprises a cylinder 31 which contains an adsorption column of an adsorbent such as molecular-sieve carbon (MSC), a pump P for compression and pressure reduction, a feed valve 32 for feeding a gas mixture (air), a valve 33 for directing air into the cylinder 31, a valve 34 for directing a separated product gas ($N_2$) to a reservoir 38, a valve 35 for discharging a gas in the cylinder, a valve 36 for directing waste gas ($O_2$) to outside, a purge valve 37, a reservoir 38 for product gas, a reservoir 39 for feed gas, a valve 40 (manual or constant-flow valve) for taking product gas out of the system, pressure sensors $S_1$ and $S_2$, and conduits 50, 51, 52 and 53. The valves 32 to 37 are automatic valves.

The system illustrated in FIG. 2 can be modified to give a more compact one. For example, the reservoir 39 for feed gas may be omitted to connect the pump P directly to the valve 33. The reservoir 38 for product gas may be an elastic vessel or bag such as a diaphragm. Alternatively, another vacuum pump may be joined to the valve 35 to use the pump P only for supplying a gas mixture in order to enhance the purity of product gas. A valve 41 may be placed on the conduit 52 in order to introduce a feed air directly to the cylinder 31 under atmospheric pressure.

Product $N_2$ gas is produced from feed air in the repeated cycle of the gas separation process and the column generation (discharge and desorption) process as follows. In the gas separation process, the feed air is supplied through the air-feed valve 32 and the pump P to the air reservoir 39, which is kept at almost constant pressure. The valve 33 is opened and closed intermittently according to a previously determined make-and-break (on-off) pattern of valve (called a "valve sequence"). Air in an amount predetermined for the valve sequence is supplied through the conduits 50 and 52 to the adsorption column cylinder 31, and the pressure within the cylinder becomes the predetermined highest pressure.

Before or after the pressure in the cylinder 31 reaches the predetermined highest pressure, the valve 34 is preferably opened and closed intermittently according to the valve sequence to take out the separated $N_2$ gas from the cylinder 31 through the conduit 53 to the product gas reservoir 38.

For performing the column regeneration process, the valves 32, 33 and 34 are closed, while the valves 35 and 36 are opened. By this action, unnecessary $O_2$ gas in the cylinder 31 passes through the conduit 51 and the pump P to run away in air through the valve 36, and the pressure of the cylinder reaches atmospheric pressure. Subsequently, the valve 37 is opened and closed intermittently and a portion of the product gas in the reservoir 38 is allowed to flow countercurrently (flow opposite to the movement of air in the gas separation process) through the column in the cylinder 31, whereby $O_2$ gas having been adsorbed in the column is desorbed and purged away.

Prior to the purging step, the interior of the cylinder may be processed to reach more reduced pressure using a vacuum system, or the supply of the purge gas (i.e., product gas) and the operaton of the vacuum pump can be alternately performed. Alternatively, the feed gas may be introduced into the cylinder after a portion of purge gas is once introduced in the cylinder. The combination of these procedures is effective to perform the desorption of $O_2$ gas efficiently to enhance the purity of the finally obtained product gas.

For the introduction of feed air in the gas separation process, air may be introduced directly from the valve 41 into the cylinder 31 according to the valve sequence without using the pump P when the lowest pressure in the cylinder is below the atmospheric pressure. The upper stream side of the valve 41 is always at constant atmospheric pressure. Alternatively, the pressure in the cylinder may be first increased to reach atmospheric pressure by means of the valve 41 in the initial stage of the introduction of feed air and then further increased to the highest pressure by means of the valve 33, whereby control of the introduction of feed air can be made with increased precision.

Figure 3:
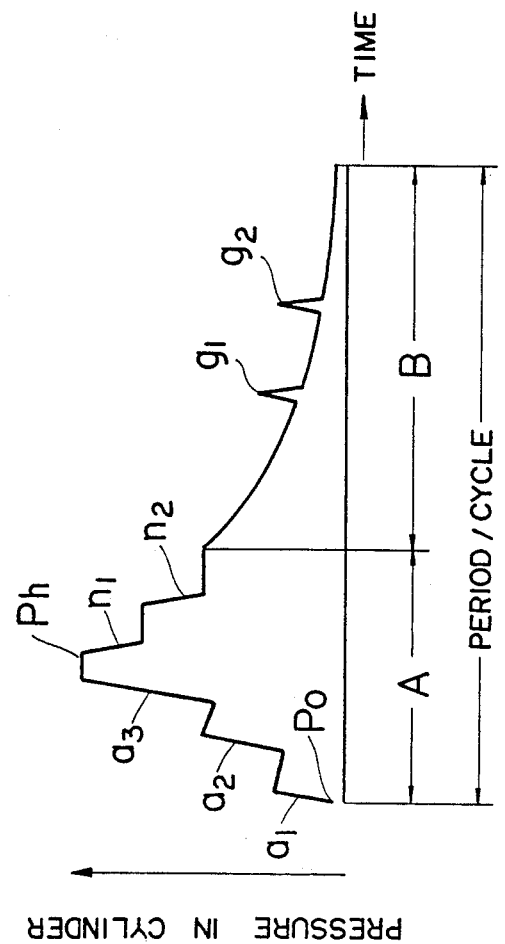
FIG. 3 is a graph showing variation of pressure in the cylinder in one cycle in the case of conducting the process of the invention using the system of FIG. 2.

FIG. 3 is a graph in which pressure change in the cylinder is plotted as ordinate and time change of one cycle as abscissa (i.e., a graph of pressure sequence). In the gas separation process (region indicated by A), the pressure of the column is increased stepwise to the highest pressure by three times open-and-close action (indicated by $a_1$, $a_2$ and $a_3$) of the valve 33 for introducing the feed gas. The pressure in the cylinder is then reduced stepwise by twice open-and-close action (indicated by $n_1$ and $n_2$) of the valve 34 for taking out the product gas from the cylinder. In the column regeneration process (region indicated by B), the pressure in the cylinder is reduced rapidly to the lowest pressure by opening the valve 35 and subsequently by twice open-and-close action (indicated by $g_1$ and $g_2$) of the valve 37 for performing the purging step.

Figure 4:
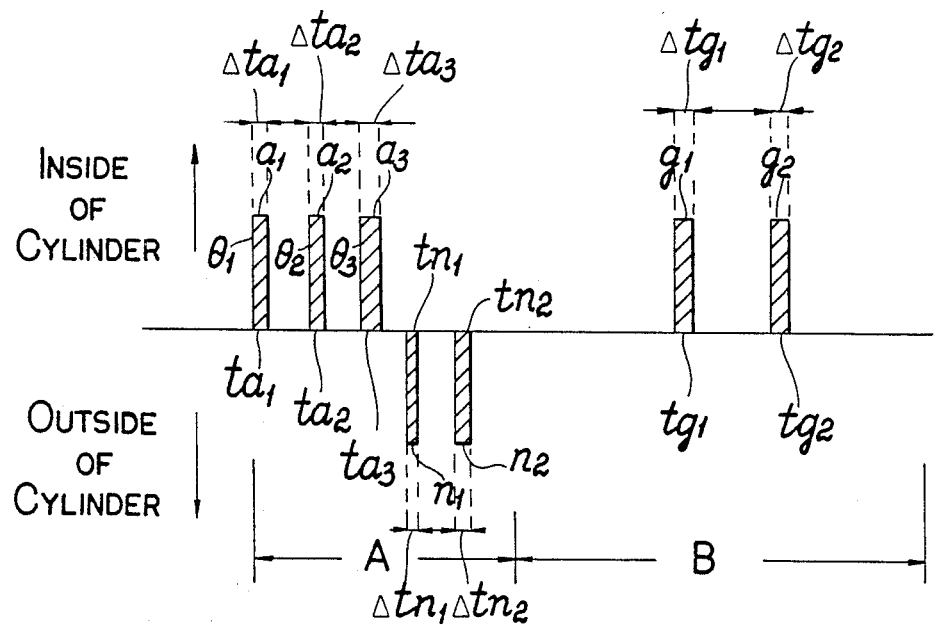
FIG. 4 is a graph showing actuating operations (on-off) of valves to give the variation of pressure in the course of one cycle of FIG. 3.
Figure 5:
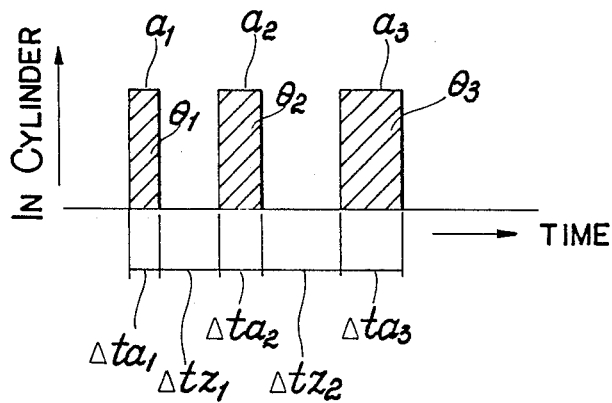
FIG. 5 is a partially enlarged view of FIG. 4.

FIG. 4 is a graph showing actuating operations of valves to give the pressure sequence of FIG. 3. FIG. 5 is a partially enlarged graph of FIG. 4. In FIGS. 4 and 5, $t_{a1}$, $t_{a2}$ and $t_{a3}$ mean the starting times of the first valve-opening action $a_1$, the second valve-opening action $a_2$ and the third valve-opening action $a_3$, respectively, wherein starting time of the adsorption step is fixed to 0 sec. $\Delta t_{a1}$, $\Delta t_{a2}$ and $\Delta t_{a3}$ mean the first valve-opening time (sec.) (i.e., pulse time), the second valve-opening time and the third valve-opening time, respectively. Each of $\Delta t_{n1}$, $\Delta t_{n2}$, $\Delta t_{g1}$ and $\Delta t_{g2}$ has a meaning similar to the above. $\Delta t_{z1}$ and $\Delta t_{z2}$ mean valve-closing time (sec.), that is, waiting time (i.e., pause time). The preferred degrees of increase of pressure in $a_1$, $a_2$ and $a_3$ are not usually equal to each other. These degrees depend upon various parameters such as pressure in the cylinder just before the time of opening valve, the composition of gas mixtures, type and particle size of adsorbent, shape of cylinder, temperature and kind of automatic valve, and can be determined by experiments.

For instance, in the case that nitrogen gas is separated from air using a molecular-sieve carbon, the relationship between the pressure change in the cylinder from the lowest pressure $P_0$ to the highest pressure $P_h$ ($P_3$) caused by the three times valve action ($a_1$, $a_2$ and $a_3$) and the amount of introduced gas (amount of gas influx, $Q_1$, $Q_2$ and $Q_3$) can be described approximately as follows. The pressure change (in terms of absolute pressure basis) caused by the valve action and the amount of introduced gas (influx) are as follows.

|   | Pulse Time (sec.) | Pressure Change (kg./cm$^2$) | Amount of Gas Influx (cc.) |
|---|---|---|---|
| $a_1$ | $\Delta t_{a1}$ | $P_0 - P_1$ | $Q_1$ |
| $a_2$ | $\Delta t_{a2}$ | $P_1 - P_2$ | $Q_2$ |
| $a_3$ | $\Delta t_{a3}$ | $P_2 - P_3$ | $Q_3$ |

$$\text{Relation:} \quad \frac{Q_1}{P_0 + P_1} = \frac{Q_2}{P_1 + P_2} = \frac{Q_3}{P_2 + P_3} \qquad (1)$$

When dead volume in the cylinder 31 is V cc. and the pressure in the cylinder just before opening the valve is $P_0$ kg./cm$^2$ (at absolute pressure basis), the amount of influx $Q_1$ is represented by the following formula:

$$Q_1 = V \times P_0 \qquad (2)$$

The pulse time $\Delta t_{a1}$, $\Delta t_{a2}$ and $\Delta t_{a3}$ are approximately determined based on nature of valve and the formulas (1) and (2). However, the accurate pulse time should be determined by experiments.

In formula (2), each amount of influx is represented by the following relations:

$$Q_1 = K(P_1 - P_0)V$$
$$Q_2 = K(P_2 - P_1)V \qquad (3)$$
$$Q_3 = K(P_3 - P_2)V$$

wherein K is an experimentally determined constant (K > 1). Thereby, the formula (1) is modified to give the following formula:

$$\frac{P_1 - P_0}{P_0 + P_1} = \frac{P_2 - P_1}{P_1 + P_2} = \frac{P_3 - P_2}{P_2 + P_3} \qquad (4)$$

When the total amount of influx into the cylinder by the three times valve action is fixed in view of the system design, the quantitative relationship between $Q_1$, $Q_2$ and $Q_3$ can be approximately estimated based on formulas (1) to (4).

The flow rate of gas for each pulse at the valve which directly controls quantity and quality of gas to the adsorbent in the cylinder can be also estimated from flow rate including parameters such as pulse time, CV value of each valve, pressure difference between the upper and lower streams and physical properties of gas. However, it is necessary in practice that the individual steps in one cycle are simulated for each valve to determine the natures and properties of valves for respective purposes.

For performing the gas separation system of the invention, the adsorption column may comprise two adsorption columns arranged in series.

Figure 6:
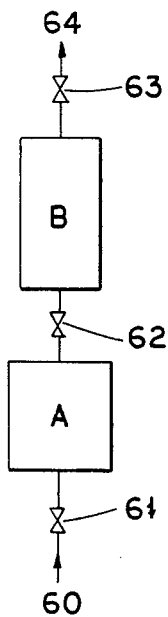
FIGS. 6 and 7 are respectively schematic views showing an arrangement of two adsorbent columns employable in the system for conducting the process of the invention.

FIG. 6 is a schematic view showing an arrangement of two adsorption columns in respective cylinders. In FIG. 6, two adsorption columns A and B are arranged in series in the flow direction (A→B) and a means 62 for controlling flow rate, which is usually an automatic valve, is placed between the columns A and B. At the other end of the column A, an automatic valve 61 for directing feed gas (air) 60 to the column A is attached and at the other end of the column B, an automatic valve 63 for taking out product N$_2$ gas 64 from the column B is attached. These are joined to each other through conduits (indicated by solid lines).

The process of the invention is carried out as follows. Feed air 60 is introduced into the adsorption column A by means of the intermittent open-and-close action of the valve 61. The feed air is intensely swung among the adsorbent particles in the column A and thereby, renewal of surfaces among the adsorbent particles proceeds and density of an adsorbate in gas phase is lowered within a short time. Thus, a zone of adsorbed gas (i.e., adsorbate of O$_2$ gas) is formed all over the column to retain the air in the column A at one time. Then, the flow-rate control means (valve) 62 is opened to transfer the air retained in the column A to the column B. The air is transferred at almost a constant flow rate by using a flow-rate control valve. In the column B, suitable density gradient of the adsorbate is formed and thereby, the air in which $N_2$ density has been enhanced in the column A is further enhanced in $N_2$ density and finally becomes $N_2$ gas at a high purity, which is taken out through the valve 63. Thus, the feed air is subjected to rough separation treatment in the column A and to accurate separation treatment in the column B, so that a product gas of high purity can be obtained.

After the gas separation process is complete, the inlet-side end of the column A is kept under reduced pressure and the valve 61 is opened to release $O_2$ gas remaining in the column A out of the system. The flow-rate control valve 62 is intermittently opened and closed and thereby, the air in which the major component is $N_2$ gas in the column B is released (i.e., countercurrently purged) in the column A to accelerate desorption of $O_2$ gas from the column A. Then, the valve 63 is intermittently opened and closed to purge the column B countercurrently with product $N_2$ gas and thereby, desorption of $O_2$ gas in the column B is accelerated.

Figure 7:
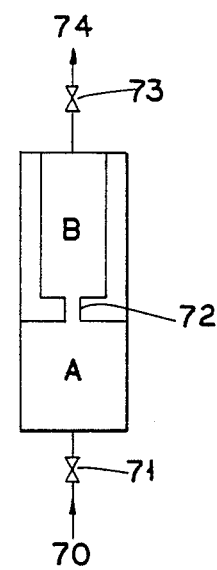

The adsorbent columns A and B can have any structure, so far as an adsorbed gas zone is formed independently in each column. Two columns may be included in one adsorption column and the means for controlling flow rate may be an orifice. FIG. 7 shows another embodiment in which two columns A and B are integrated into one column and an orifice 72 is provided in a position to form a partition between the columns A and B. The elements 70, 71, 73 and 74 of FIG. 7 correspond to elements 60, 61, 63, and 64, respectively, of FIG. 6.

Further, two or more valves for introducing feed gas may be attached to the inlet-side end of the column A and the feed gas can be introduced thereto by alternate action of these valves, in order to promote the surface renewal among the adsorbent particles in the column A.

The column A preferably is formed of the adsorbent in such a way that volume of contact with gas is large with dead volume being as small as possible. On the other hand, the column A preferably has a large sectional area so that air flow rapidly reaches the whole adsorbent. Since the large sectional area of the column brings about increase of dead volume, the column is required to design in consideration of these points. Each of the columns A and B preferably has a shape of coaxial cylinder. In this case, a volume ratio of the columns A and B is preferably in the range of 1.0:0.2 to 1.0:1.2 (A:B) and a ratio of height and diameter of the column B is preferably in the range of 10:1 to 2:1 (height:diameter).

As for the adsorbent, molecular-sieve carbon (MSC) of an adsorbent for $O_2$ gas is usually employed. A particle size of the adsorbent is preferably in the range of 20 to 100 mesh. A part of the column A near the inlet end may be formed of an adsorbent such as silica gel or activated alumina as a drying agent.

Figure 8:
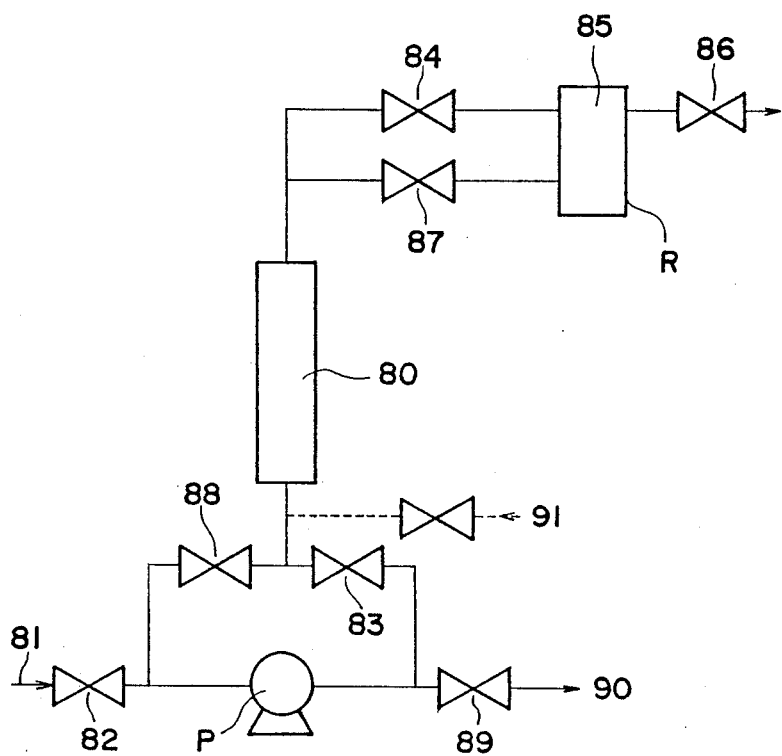
FIG. 8 is a schematic flowsheet showing another system suitably employable for the process of the invention.
Figure 9:
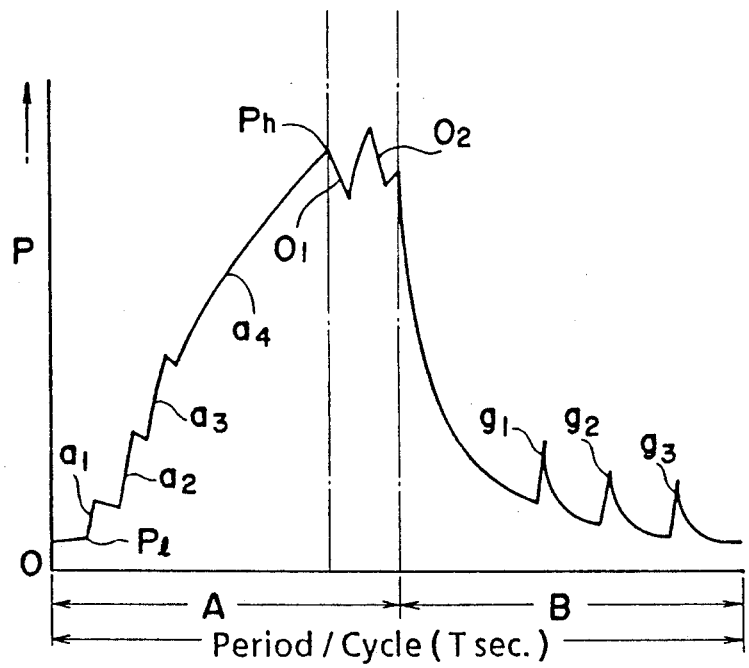
FIG. 9 is a graph showing variation of pressure in a cylinder having an adsorption column in one cycle in the case of conducting the process of the invention using the system of FIG. 8.
Figure 10:
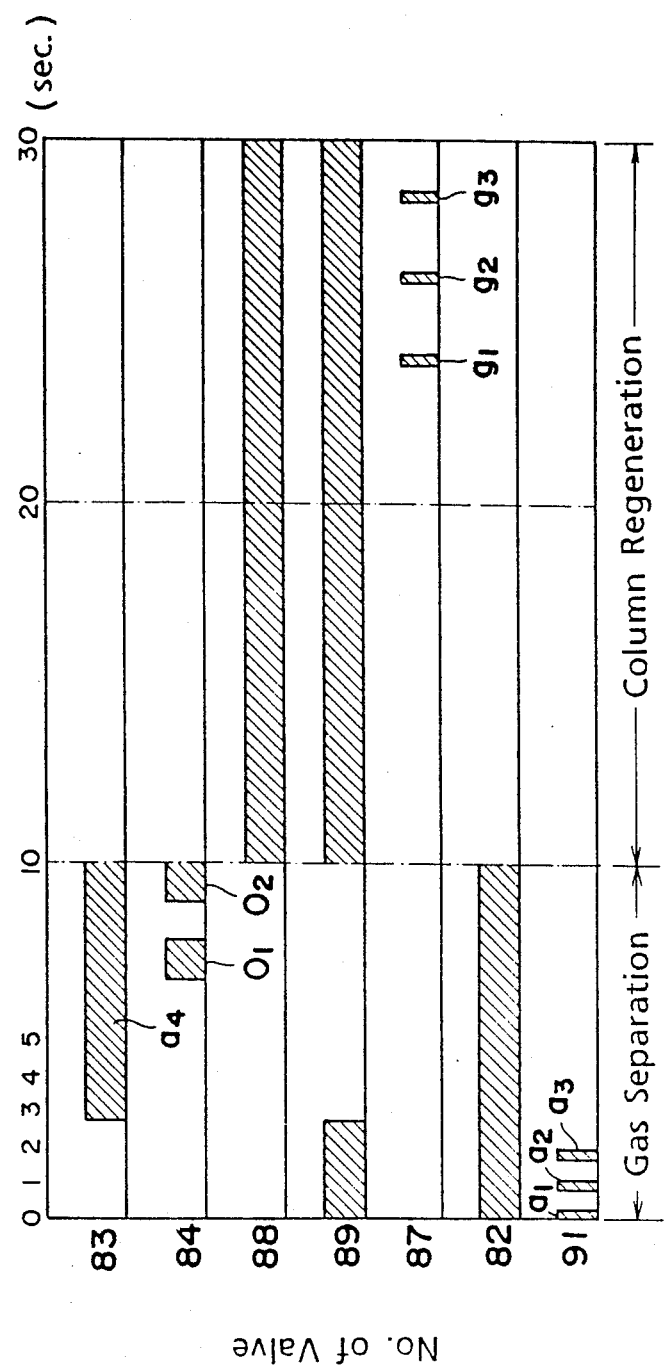
FIG. 10 is a diagram showing actuating operations of valves to give the variation of pressure in one cycle of FIG. 9.

FIG. 8 is a schematic flowsheet showing another system with one column for separating oxygen gas from air. FIG. 9 is a graph showing pressure sequence in one cycle, wherein P1 is the lowest pressure, (cycle time:T sec.) and FIG. 10 is a diagram showing typical valve sequence in one cycle.

The system of FIG. 8 comprises a cylinder 80 of an adsorption column, a pump P for compression and pressure reduction, a reservoir R for product gas ($O_2$), a feed gas mixture (air) 81, a valve 82 for feeding the gas, a valve 83 for directing the feed gas to the column 80, a valve 84 for directing product gas to the reservoir R, a product gas 85, a purge valve 87, a valve 88 for discharging a gas from the cylinder, a valve 89 for directing waste gas ($N_2$) to outside, a waste gas 90, a valve 91 which is in direct contact with atmospheric air and directs the feed gas to the cylinder 80, and a valve 86 (manual valve) for taking product gas out of the system. The valves other than the valve 86 are automatic valves.

Product $O_2$ gas is produced from the feed air in the repeated cycle of the gas separation process and the column regeneration process in the following manner.

In the initial stage of the gas separation process, the valve 91 is intermittently opened and closed three times (indicated by $a_1$, $a_2$ and $a_3$ in FIGS. 9 and 10) to introduce the feed air into the cylinder 80.

Subsequently, the pump P is actuated and the valve 82 is opened and thereby, the feed air 81 is introduced and reaches the valve 83 through the pump P. The valve 83 is then opened (indicated by $a_4$) to supply the feed air to the column in the cylinder 80, and the pressure in the cylinder 80 is increased. Feed gas (air) 81 is further supplied, and the pressure in the cylinder 80 is further increased and reaches the predetermined pressure. Then, the operation of the valve 84 is started in such a mode to open and close intermittently (indicated by $O_1$ and $O_2$) and thereby, unadsorbed gas ($O_2$ gas) is taken out from the cylinder 80 and stored in the product gas reservoir R as a product gas 85. The product gas 85 stored in the reservoir R is taken out of the system through the valve 86. The supply of the feed gas is then terminated.

In the initial stage of the regeneration process, the pump P is so actuated that the conduit connected to the pump P is placed under reduced pressure, and then the valves 88, 89 are opened. When these valves are opened, a portion of $N_2$ gas trapped in the column is desorbed and flows through the valve 88, the pump P and the valve 89 to run out as waste gas 90. The pressure in the cylinder 80 is reduced first rapidly and then slowly.

Subsequently, the valve 87 is intermittently opened and closed three times (indicated by $g_1$, $g_2$ and $g_3$) to return a portion of the product gas 85 into the cylinder 80. The returned product gas is rapidly expanded in the cylinder having been placed under reduced pressure, and flows downward, desorbing $N_2$ from the adsorbent, to run out from the valve 89 as waste gas. Thus, the adsorbed $N_2$ is removed, and the regeneration of the adsorption column is complete.

In the column regeneration process, the opened valve 88 may be intermittently closed in association with the pulse action of the purge valve 87. By this action, the returned product gas is retained in the cylinder for a while and then discharged together with desorbed $N_2$ gas therefrom, so that the desorption of $N_2$ gas can be more efficiently conducted.

Figure 11:
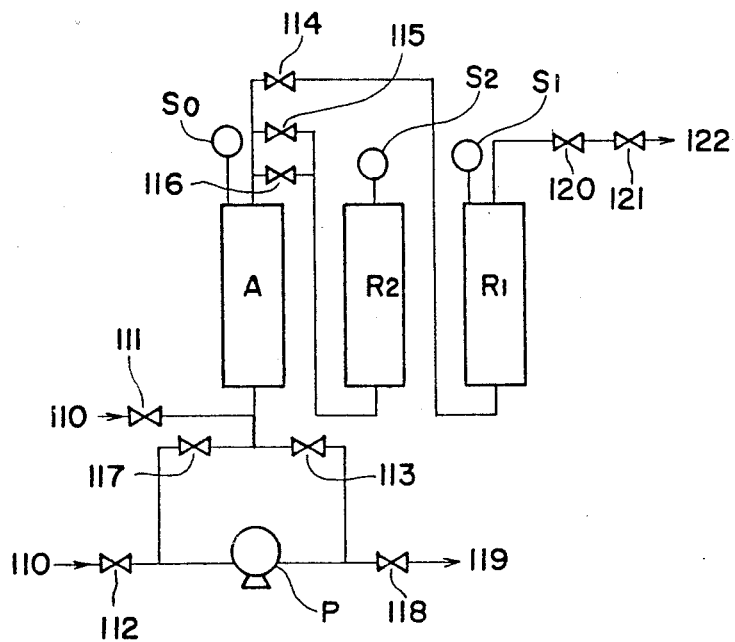
FIG. 11 is a schematic flowsheet showing a different system still suitably employable for the process of the invention.

FIG. 11 is a schematic flowsheet showing another system using one adsorption column and two reservoirs.

In FIG. 11, the system comprises a cylinder A having an adsorption column, a feed gas mixture (air) 110, feed valves 111 and 112 for the feed gas, a valve 113 for directing the feed gas to the cylinder A, a valve 114 for directing product gas ($O_2$) to a reservoir $R_1$ for storing product gas for actual use, a valve 115 for directing product gas to a reservoir $R_2$ for storing product gas to be used for purging, a purge valve 116, a valve 117 for taking out a gas from the cylinder A, a valve 118 for directing waste gas (N$_2$) to outside, waste gas 119, a flow control valve 120, a stop valve 121, a product gas for actual use 122, a pump P for compression and pressure reduction, a pressure indicator S$_0$ for the cylinder A, a pressure indicator S$_1$ for the reservoir R$_1$, and a pressure indicator S$_2$ for the reservoir R$_2$. The valves other than the valves 120 and 121 are automatic valves.

Product O$_2$ gas is produced from the feed air in a repeated cycle of the gas separation process and the column regeneration process in the following manner. In the gas separation process, the valve 111 is intermittently opened and closed twice to introduce feed air to the cylinder A whose adsorption column has been already regenerated. Subsequently, the valve 112 is opened and thereby, feed air 110 compressed by the pump P reaches the valve 113. The valve 113 is opened to supply the feed air 110 to the cylinder A. Thus, the predetermined amount of feed air is portionwise introduced to the cylinder A.

Before or after the interior of the cylinder A reaches the predetermined highest pressure (P$_h$), the valve 114 is intermittently opened and closed according to the fixed valve sequence and thereby, unadsorbed O$_2$ gas (product gas) is taken out of the cylinder A and stored in the reservoir R$_1$, for actual use. Then, the valve 114 is closed and the valve 115 is intermittently opened and closed according to the fixed valve sequence and thereby, another portion of unadsorbed O$_2$ gas is taken out of the cylinder A and stored in the purge-gas reservoir R$_2$. Thus, the product gas is separately stored in two reservoirs by actuating these two valves. As is described above, the pulse action of the valve 114 is preferably performed before that of the valve 115, but may be performed after the pulse action of the valve 115. The product gas stored in the reservoir R$_1$ is continuously taken out of the system as a product gas 122 (for actual use) at constant flow rate through the flow control valve 120 and the stop valve 121.

At the beginning of the column regeneration process, the valves 111, 112, 113, 114 and 115 are closed, the pump P is actuated, and the valves 117 and 118 are opened to discharge unnecessary N$_2$ gas adsorbed in the adsorption column in the cylinder A as waste gas 119 from the system through the valve 118. As the N$_2$ gas flows out, the pressure in the cylinder A is reduced from a higher level to almost the lowest level. Subsequently, the valve 116 is intermittently opened and closed three times while opening the valve 117 to purge the adsorption column in the cylinder A with the product gas stored in the purge-gas reservoir R$_2$, so that desorption of retained N$_2$ gas is accelerated.

The gas reservoir for actual use R$_1$ and the purge-gas reservoir R$_2$ can have any structure. The gas reservoir R$_1$ is preferably variable in volume and comprises an elastic vessel from the viewpoint of designing the whole separation system to be compact. Examples of such reservoirs include a diaphragm tank and a water seal tank. The purge-gas reservoir R$_2$ can be in the shape of a hollow cylinder and arranged concentrically with the cylinder A outside thereof.

Examples of the invention and comparison examples are given below.

EXAMPLE 1

Oxygen gas was separated from air using the two-cylinder apparatus shown in FIG. 1 for performing the improved PSA process according to the invention. Each of the cylinders for adsorption column had a diameter of 11 cm. and a height of 44 cm. and packed with 3.1 kg. of a molecular sieve (MS-5A) to form an adsorption column. All valves except valve 11 were ⅜-inch type electromagnetic valves having an opening area of 11 mm$^2$. The valve is kept under opening conditions. Adsorption was performed at a gauge pressure of 1.2 kg./cm$^2$. One cycle for the set of the gas separation process and the column regeneration process required 36 seconds. In the step for purging adsorbed gas using a portion of the collected oxygen was also repeated three times with an opening period of 0.5 second for each time.

The results are given below.
Amount of supplied air: 20 Nl/cycle
Amount of finally collected O$_2$ gas: 0.70 Nl/cycle
Yield of finally collected O$_2$ gas: 15%
Purity of finally collected O$_2$ gas: 90%
Adsorbent productivity: 20.3 l-O$_2$/kg.hr.

COMPARISON EXAMPLE 1

Oxygen gas was separated from air using the same two-cylinder apparatus as in Example 1 for performing the conventional pressure swing adsorption process.

The process was carried out in the same manner as in Example 1 except that each step was performed by opening the valve only once according to the conventional PSA process.

The results are given below.
Amount of supplied air: 20 Nl/cycle
Amount of finally collected O$_2$ gas: 0.60 Nl/cycle
Yield of finally collected O$_2$ gas: 13%
Purity of finally collected O$_2$ gas: 90%
Adsorbent productivity: 17.4 l-O$_2$/kg.hr.

As is evident from the above-mentioned results, the yield of recovery of product gas in Example 1 was higher than that in Comparison Example 1. The increase of the amount of recovery in Example 1 is considered due to decrease of loss of product gas (collected gas) in the purge step.

EXAMPLE 2

Nitrogen gas was separated from air by using the one-column system shown in FIG. 2 for performing the improved pressure swing process of the invention. The cylinder for the adsorption column had a diameter of 3.6 cm. and a height of 45 cm., and the inlet end part of the cylinder was packed with 91 g. of activated alumina and the other part with 204 g. of molecular seive-carbon (MSC) at a particle size of 40 to 80 mesh. The valves were all electromagnetic valves in which the valves 34, 37 and 41 were of ¼-inch type and the other valves were of ⅜-inch type. The gas separation was performed at an absolute pressure in the range of 0.1 to 1.7 kg./cm$^2$ according to the valve sequence set forth in Table 1. In Table 1, cycle time was 30 sec.

TABLE 1

| Valve Number | Valve-opening Time (sec.) | | |
|---|---|---|---|
| 32 | 0–15 | | |
| 33 | 4–15 | | |
| 34 | 9–15 | | |
| 35 | 15–30 | | |
| 36 | 0–4, | 15–30 | |
| 37 | 22–22.1, | 25–25.1, | 28–28.1 |
| 41 | 0–0.1, | 1–1.1, | 2–4 |

The results are given below:

Purity of finally collected $N_2$ gas: 96.5% (at an amount of $N_2$ gas of 300 cc./min.)

Adsorbent productivity: 85.1 $1-N_2/kg.(H)$

EXAMPLE 3

Oxygen gas was separated from air by using the one-column system shown in FIG. 8 for performing the improved pressure swing adsorption process of the invention. The cylinder of the adsorption column was made of stainless steel and had a diameter of 3.56 cm. and a height of 42.0 cm. The inlet end part of the cylinder was packed with 75 g. of activated alumina and the other part with 300 g. of MS-5A at a particle size of 30 to 60 mesh, which had been subjected to a heat-activation treatment at 280° C. for 10 hr. prior to the use. The valves other than the valve 86 of manual one were ¼-inch type electromagnetic valves. The pump P was of 120-watt type for compression and pressure reduction. The gas separation was performed according to the valve sequence shown in FIG. 10 and cycle time was 30 sec. which comprises 10 sec. of the adsorption step and 20 sec. of the reproduction step.

In the gas separation process, the valve 91 was opened and closed three times to pressurize the interior of the cylinder, that is, opened for pulse time (indicated by $a_1$ in FIG. 10) of 0.1 sec., closed for pause time of 0.9 sec., opened for pulse time ($a_2$) of 0.2 sec., closed for pause time of 0.8 sec., opened for pulse time ($a_3$) of 0.3 sec., and closed for pause time of 0.7 sec. Then, the valve 83 was opened to further pressurize the interior of the cylinder (time ($a_4$) of 7.0 sec.).

In the column regeneration process, the valve 87 was opened and closed three times to purge the adsorption column with a portion of product gas, that is, opened for pulse time ($g_1$) of 0.1 sec., closed for pause time of 1.9 sec., opened for pulse time ($g_2$) of 0.1 sec., closed for pause time of 1.9 sec. and then opened for pulse time ($g_3$) of 0.1 sec.

The results are given below:

Purity of finally collected $O_2$ gas: 94.5% (at an amount of $O_2$ gas of 96 cc./cycle)

Adsorbent productivity: 36.3 $1-O_2/kg.(H)$

It has been further confirmed that the adsorption productivity could be increased by shortening the cycle period of time.

COMPARISON EXAMPLE 2

Oxygen gas was separated from air in the same manner as described in Example 3 except that the intermittent open-close actions of the valves 91, 83 and 87 were not conducted. That is, these valves were once opened and closed. The results are given below:

Purity of finally collected $O_2$ gas: 60% (at an amount of $O_2$ gas of 60 cc./cycle)

Purity of finally collected $O_2$ gas: 90% (at an amount of $O_2$ gas of 30 cc./cycle)

Adsorbent productivity: 10.8 $1-O_2/kg.(H)$

I claim:

1. A process for selectively separating a desired gas component from a gas mixture of two or more gas components, which comprises the steps of:
    (1) introducing the gas mixture under pressure into a cylinder having therein an adsorption column of an adsorbent which selectively adsorbs thereon at least one gas component other than the desired gas component from an inlet of the cylinder, to allow the adsorbent near the inlet to selectively adsorb the gas component other than the desired gas component and to form a zone of adsorbed gas in the column;
    (2) keeping the introduction of the gas mixture into the cylinder under conditions such that the gas mixture flows through the column to move the front of the adsorbed gas zone forwards;
    (3) collecting the desired gas component having passed through the column from an outlet of the cylinder;
    (4) terminating the introduction of the gas mixture into the cylinder;
    (5) terminating the collection of the desired gas component;
    (6) discharging a portion of the pressurized gas mixture remaining in the cylinder; and
    (7) returning a portion of the collected gas component back into the cylinder at an intermittently varying rate to flow through the column in the direction opposite to the direction of the movement of the gas mixture in the step (2), to desorb the gas component having been adsorbed on the adsorbent of the adsorption column and purge away the desorbed gas component from the cylinder.

2. The process as claimed in claim 1, wherein said intermittently varying rate of the returned gas in the step (7) is produced by means of opening and closing of a valve provided between the cylinder and reservoir of the collected gas.

3. The process as claimed in claim 1, wherein the introduction of the gas mixture into the cylinder in the step (2) is performed at an intermittently varying rate.

4. The process as claimed in claim 1, wherein the collection of the desired gas component in the step (3) is performed at an intermittently varying rate.

5. The process as claimed in claim 1, wherein the dischargement of the gas mixture in the step (6) is performed at an intermittently varying rate.

6. The process as claimed in claim 1, wherein the desired gas is collected into two separate reservoirs, one reservoir being for supply of the desired gas component for its expected use and another being for the returning back of the collected gas component to the cylinder.

7. The process as claimed in claim 1, wherein said gas mixture is air and said desired gas component is nitrogen gas.

8. The process as claimed in claim 1, wherein said gas mixture is air and said desired gas component is oxygen gas.

* * * * *